United States Patent
Magnitskii et al.

(10) Patent No.: US 7,406,027 B2
(45) Date of Patent: Jul. 29, 2008

(54) OPTICAL DATA STORAGE SYSTEM HAVING COMBINED FLUORESCENT THREE-DIMENSIONAL INFORMATION CARRIER

(75) Inventors: Sergey Magnitskii, Moscow (RU);
Dimitrij Pebalk, Moscow (RU);
Vladimir Shubin, Moscow (RU);
Eugene Levich, New York, NY (US);
Andrey Tarasishin, Moscow (RU);
Alexej Lezhnev, Moscow (RU);
Vladimir Kozenkov, Dolgoprodnij (RU); Mihail Kvasha, Moscow (RU);
Galina Dorozhkina, Dolgoprodnij (RU);
Nikolay Magnitskii, Moscow (RU)

(73) Assignee: D Data Inc., New York, NY (US)

( * ) Notice: Subject to any disclaimer, the term of this patent is extended or adjusted under 35 U.S.C. 154(b) by 317 days.

(21) Appl. No.: 11/300,255

(22) Filed: Dec. 13, 2005

(65) Prior Publication Data
US 2006/0099376 A1    May 11, 2006

Related U.S. Application Data

(62) Division of application No. 09/616,965, filed on Jul. 14, 2000, now Pat. No. 7,082,093.

(60) Provisional application No. 60/144,019, filed on Jul. 15, 1999.

(51) Int. Cl.
*G11B 3/70* (2006.01)

(52) U.S. Cl. .......................... 369/283; 369/288

(58) Field of Classification Search ............... None
See application file for complete search history.

(56) References Cited

U.S. PATENT DOCUMENTS

| | | | | |
|---|---|---|---|---|
| 4,927,681 A | 5/1990 | Chikuma | ..................... | 428/64 |
| 5,103,443 A | 4/1992 | Gerber | ..................... | 369/100 |
| 6,009,065 A | 12/1999 | Glushko et al. | ............. | 369/112 |
| 6,071,671 A | 6/2000 | Glushko et al. | ............. | 430/270 |
| 6,522,616 B1 * | 2/2003 | Magnitski et al. | ............ | 369/103 |

FOREIGN PATENT DOCUMENTS

| | | |
|---|---|---|
| DE | 4444988 A1 | 6/1996 |
| EP | 0 354 601 A2 | 2/1990 |
| JP | 11149663 | 6/1999 |
| WO | WO 98/26252 | 6/1998 |
| WO | WO 98/33864 | 8/1998 |
| WO | WO 98/50914 | 11/1998 |
| WO | WO 99/09550 | 2/1999 |
| WO | WO 99/23647 | 5/1999 |
| WO | WO 99/23649 | 5/1999 |

* cited by examiner

*Primary Examiner*—Paul Huber
(74) *Attorney, Agent, or Firm*—Winston & Strawn LLP

(57) ABSTRACT

A general optical storage system (OSS) contains an optical drive and a fluorescent multilayer disc (FMLD), which can be realized as a multilayer structure with data storage in fluorescent spots like pits or spiral grooves, divided by layers, transparent to reading and fluorescent radiation. The OSS includes a fluorescent signal reception device, capable of reading FMLD, as well as reflective CD and DVD discs (including CD-R, CD-RW, DVD-R, etc.). Increase of pit width in FMLD and use of microangle mirrors allow increase of the information signal. Elimination of FMLD fluorescence lifetime influence on data pulse duration allows an increase in the data reading rate. The absorption indices of different layers of FMLD are optimized.

18 Claims, 7 Drawing Sheets

OPTICAL DATA STORAGE SYSTEM HAVING COMBINED FLUORESCENT THREE-DIMENSIONAL INFORMATION CARRIER

REFERENCE TO RELATED APPLICATIONS

This application is a division of application Ser. No. 09/616,965, filed Jul. 14, 2000, now U.S. Pat. No. 7,082,093 and claims the benefit of provisional application No. 60/144,019, filed Jul. 15, 1999. The entire content of each application is expressly incorporated herein by reference thereto.

BACKGROUND OF THE INVENTION

1. Field of the Invention

This invention relates to an optical storage system and more specifically to a storage system comprising a fluorescent disc with many information layers and a drive for reading information from such a disc.

2. State of the Art

Single-layer (as well as two-layer) two-dimensional optical storage systems are widely used in existing devices. Most of the previous technical solutions in such systems of optical data storage were based on registering the change of reflected laser radiation intensity in the local spots (pits) of the data carrying layer. These changes could arise from light interference on the relief optical discs like CD ROM, from reversible polarization effects in magneto-optical or photoanisotropic media, as well as from reversible or non-reversible changes of reflection index in phase change media, or from dyes clearing up in "dye-reflection layer" systems, etc.

Three-dimensional (i.e., multilayer) optical memory devices provide higher capacity of recorded or stored data than two-dimensional systems. However, they have certain restrictions and additional requirements for construction and different features for recording media, and ways of recording and reading data, especially in the depth of the registering media.

In the reflection regime, every data-carrying layer of a multilayer optical medium requires a partly reflective covering. The use of such coverings reduces the intensity of both the reading beam and the reflected, data carrying beam as a result of direct and reverse passage through the medium towards the necessary data-carrying layer and back to the receiver. In addition, both coherent beams are subject to difficult-to-estimate diffraction and interferential distortions on the spots (pits and grooves) of the data-carrying layers while being transmitted.

SUMMARY OF THE INVENTION

A general optical storage system (OSS) contains a fluorescent multilayer disc (FMLD) and a reading device. The invention also relates to a combined FMLD ROM. The invention additionally relates to a reading device for the data, recorded on a ROM, WORM or RW fluorescent multilayer disc, compatible with reflective CD and DVD-discs. To distinguish a fluorescent signal from a reflected laser signal, the reading device is equipped with a tunable optical element, such as a dichroic mirror, a passive (mechanically distressed) or active (electrooptic) polarizer, tunable to the reflection spectrum and light filter (of Notch type on liquid crystals) passage, etc.

The invention further provides a means to increase the information signal received from multilayer fluorescent optical discs, resulting in a reduction of errors when reading from the disc. The invention places a light absorption element, i.e., angle mirror of pyramid type, at the side of the disc, opposite to the reading side. In this case, a part of fluorescent radiation is reflected from the angle mirror and collected by the aspherical lens of the drive reading system. This method allows the fluorescent signal to nearly double.

Another way to increase the amount of information carried by fluorescent signal is to widen the pit in comparison with the CD or DVD standard. The invention additionally increases the maximum reading rate of the FMLD by compensating fluorescence lifetime influence on changing data pulses' duration.

A further embodiment of the invention provides an improved FMLD manufacturing method.

Still another embodiment of the invention provides for optimization of absorption index values distribution among different information layers in FMLD.

A further embodiment of the invention provides an improved FMLD manufacturing method and its fluorescent composition receipt.

In this embodiment, multilayer discs with fluorescent reading where partly reflective coatings are not necessary, are more preferable. Diffraction and interferential distortions are decreased owing to non-coherence of fluorescent radiation, its higher wavelength in comparison to the reading laser radiation, as well as the transparency and homogeneity (equality of refraction indices of different layers) of the optical media with respect to the incident laser and fluorescent radiation. Therefore, multilayer fluorescent discs have the advantage in comparison to reflective ones.

BRIEF DESCRIPTION OF THE DRAWINGS

Preferred embodiments of the present invention will be set forth in detail with reference to the drawings, which show the following.

DETAILED DESCRIPTION OF THE PREFERRED EMBODIMENTS

Figure 1:
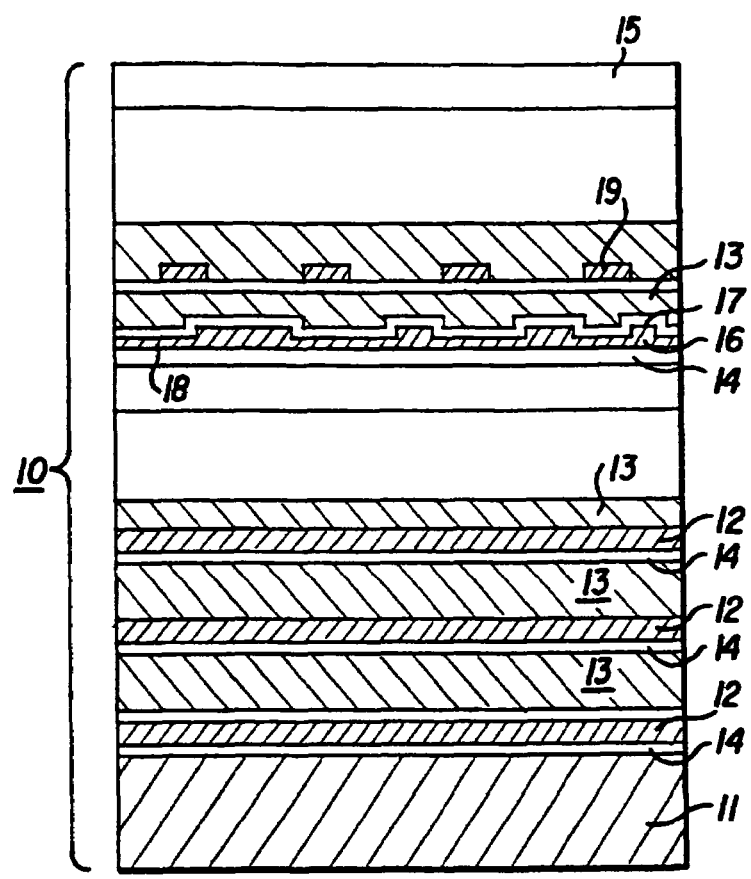
FIG. 1. Disc cross section showing a structure of a multiple layer fluorescent optical disc as a first embodiment of the present invention.

Preferred embodiments of the present invention will now be set forth in detail with reference to the drawings.

Let us compare theoretical and real fluorescent multilayer discs (FMD) with reflective multilayer discs (RMD) from the point of information signal values. It is assumed that both discs have spiral tracks with pits according to the DVD standard. A focusing objective with a fixed numerical aperture focuses the information signal (output signal from the disc).

Ideal RMD—a multilayer reflective disc with each layer being an ideal reflector with fixed reflection ratio. All effects but reflection, such as absorption, dispersion, etc., are neglected. The whole reflected signal carries information.

Ideal FMLD—a multilayer fluorescent disc with a constant refraction index in the volume. There is no absorption outside the pits, while the pits are filled with fluorescent dye with a fixed absorption index and its fluorescence quantum yield is equal to 1. The overlapping of the reading beam with the pit is equal to 1. Fluorescence is emitted isotropically in all directions without absorption inside the disc. Reception efficiency is defined by full material reflection of the disc, that is equal to NA=1. Fluorescence photon energy is equal to reading laser photon one.

The sufficient information signal value from layer i of a multilayer disc depends upon reflection coefficients (for RMD) and absorption coefficients in pits (for FMLD) distribution in the layers. Thus, coefficient distribution requires optimization. For fixed coefficient distribution between layers, information signal values from layers will also have a certain amplitude distribution. Let's mark minimum of n signals (n is the number of disc layers) as $P_{min}=\min P_i$. Optimization means such coefficient distribution over layers, when $P_{min}$ reaches its maximum.

It can be proved that equality of all information signals is the necessary requirement for optimization: $P_i=P_{opt}=$const.

RMD-system

Let's assume layer i has reflection index $R_i$. Then, the ideal reflection disc transmittance $T_i=1-R_i$. Notice that the beam passes the above layers (with respect to reading one) twice. The equation for the reflection coefficient R, is:

$$Ri=R_{(i+1)}(1-R_i)^2, \text{ where } R_n=1,$$

from which we get $R_i$ value in a recurrence relation $$R_i = \frac{1 + 2R_{i+1} - \sqrt{1 + 4R_{i+1}}}{2R_{i+1}}, \quad i = n-1, n-2, \ldots, 1 \quad (1)$$

with $P_{opt}=P_o R_1$, where $P_o$ is the incident radiation power on the disc surface.

See Table 1 for the exact dependence of a signal in ideal RMD on the number of layers, calculated according to formula (1):

TABLE 1

Signal value in ideal RMD system.

| | Number of layers | | | | | |
|---|---|---|---|---|---|---|
| | 5 | 10 | 20 | 30 | 50 | 100 |
| $P_{opt}/P_o$, $10^{-2}$ | 12.3 | 5.6 | 2.7 | 1.8 | 1.0 | 0.51 |

In real CD/DVD technology, the reflective coverage is obtained by metal film deposition. It is known that in the visible spectrum range, i.e., in the studied wavelength range around 600 nm, metal films have both high reflection and high absorption coefficients. This is true at least for such widely used materials as Al, Ag, Au at $\lambda\sim 600$ nm [see the reference book *Physical values* by I. S. Grigoryev, E. Z. Meylikhova, Energoatomizdat, 1991 for parameters]:

| | Material | | |
|---|---|---|---|
| | Al | Ag | Au |
| R | 0.9 | 0.95 | 0.7 |
| A = 1 − R | 0.1 | 0.05 | 0.3 |

Thus, in a real RMD system, every layer will possess both fixed reflection coefficients and finite absorption. To provide high transmittance in a multilayer RMD system, we should deposit very thin films, as the skin-layer in metals at $\lambda\sim 600$ nm is about 500 Å. However, with a decrease in the film thickness the absorption coefficient increases within a maximum range of 100 Å, where the absorption coefficient is equal to ten percent for most metals. Thus, to provide high transmission in RMD system, we should use films up to several tens of angstroms thick, but even in this case the absorption coefficient remains too high. For example, gold film with about a 50 Å thickness has a reflection coefficient of 0.172 and a transmission of 0.542, thus its absorption coefficient is 0.286 at $\lambda=650$ nm (For the structure of evaporated metal films and their optical properties, see JOSA, vol. 40, p. 203-211, 1950). According to evaluations of an ideal system, in multilayer reflection disc optimization, the layers' reflection coefficient is equal to 1-5%. Silver film fulfills these requirements. A thin silver film up to 100 Å thick has a reflection coefficient nearly equal to its absorption coefficient. Therefore, there arises monotonic dependence between reflection and absorption coefficients. We use the following equation to calculate reflection coefficient $R_i$:

$$R_i=R_{(i+1)}(1-2R_i)^2, \text{ where } R_n=1.$$

Then we get $R_i$ value as a recurrence formula:

$$Ri = \frac{1 + 4R_{i+1} - \sqrt{1 + 8R_{i+1}}}{8R_{i+1}}, \quad i = n-1, n-2, \ldots, 1 \quad (2)$$

with $P_{opt}=P_o R_1$ where $P_o$—incident radiation power on the disc.

See Table 2 for the exact dependence of a signal in such RMD on the number of layers, calculated according to the equation (2):

TABLE 2

Signal in RMD with thin silver film.

| | Number of layers | | | | | |
|---|---|---|---|---|---|---|
| | 5 | 10 | 20 | 30 | 50 | 100 |
| $P_{opt}/P_o$, $10^{-2}$ | 6.74 | 2.94 | 1.36 | 0.89 | 0.52 | 0.26 |

FMLD System

Let's assume an absorption coefficient in a pit of layer i in an ideal FMLD equal to $a_i$. Fluorescent signal power $P_i^{fl}$ from the pit in layer i, falling on the lens aperture, can be described as:

$$P_i^{fl} = P_0 \varphi_{fl} k \xi a_i \prod_{j=1}^{i-1} (1 - A_j),$$

where $\phi_{fl}$ is the fluorescence quantum yield, k is the coefficient of light-beam overlapping the pit;

$$\xi = \frac{1 - \sqrt{1 - (NA/n_r)^2}}{2}$$

is the lens collection coefficient, where NA is the numerical aperture, $n_r$ is the polymer refraction index, and $A_i$ is the total absorption in the i-layer.

For a fluorescent disc, $A_i=(S_{pit}/S_0)a_i$, where $S_{pit}/S_0$ is the ratio of the square filled by pits to the total disc surface square.

The information signal power is given by:

$$P_{opt} = \gamma P_o A_1 = \gamma P_o \frac{1}{S_0/S_{pit} + (n-1)}, \quad \gamma = \varphi_{fl} k \xi (S_0/S_{pit}) \quad (3)$$

For an ideal disc of the DVD standard, $$\varphi_{fl} = 1; \quad k = 1; \quad (S_0/S_{pit}) = 4; \quad \xi = \frac{1 - \sqrt{1 - (1/n_r)^2}}{2}$$

As it was fixed before, the collection coefficient in an ideal disc is defined by the total internal reflection angle, which depends on the reflection index of disc $n_r$. Hence, the use of emersion optics allows collection efficiency increases of up to 100%. Therefore, let's assume the collection coefficient in an ideal FMLD system is equal to 100%.

See Table 3 for the exact dependence of a signal in an ideal FMLD system on the number of layers, calculated according to equation (2):

TABLE 3

Signal value in ideal FMLD system.

| | Number of layers | | | | | |
|---|---|---|---|---|---|---|
| | 5 | 10 | 20 | 30 | 50 | 100 |
| $P_{opt}/P_o$, $10^{-2}$ | 50 | 31 | 17.4 | 12.1 | 7.6 | 3.9 |

In a real FMLD, the main factors decreasing the information signal power are limited by the collection coefficient, decreased fluorescence quantum yield, and restricted overlapping of the laser beam with the pit. Reflection from layers can be neglected, as reflection coefficients of different layers can be chosen equally with an accuracy of up to 10%, which brings Frenel reflection on every edge below 0.1%.

First, let's consider the DVD-like optical scheme with NA=0.65 and a polycarbonate disc. Dye fluorescence quantum yield in a polymer matrix can exceed 0.95, so we consider it to be equal to 1. Then at a collection coefficient of 4.4% and a beam overlap with pit 0.8, we receive the following signal values in the multilayer system:

TABLE 4

Signal value in FMLD system with DVD-like optical scheme.

| | Number of layers | | | | | |
|---|---|---|---|---|---|---|
| | 5 | 10 | 20 | 30 | 50 | 100 |
| $P_{opt}/P_o$, $10^{-2}$ | 1.7 | 1.1 | 0.61 | 0.43 | 0.27 | 0.14 |

At the same time, as stated above, maximum collection in FMLD system depends on the total internal reflection angle. From the other side, according to our investigations, the minimum polymer refraction index is equal to 1.4. Thus, increasing the lens numerical aperture up to 1 (the limit for non-emersion objective), allows us to increase the collection coefficient up to 0.15. Under these conditions, the coefficient of beam overlapping with a pit is close to 1, providing the following signal values in the multilayer system:

TABLE 5

Maximum signal value in an FMLD system with non-emersional objective.

| | Number of layers | | | | | |
|---|---|---|---|---|---|---|
| | 5 | 10 | 20 | 30 | 50 | 100 |
| $P_{opt}/P_o$, $10^{-2}$ | 7.5 | 4.7 | 2.6 | 1.8 | 1.13 | 0.582 |

Thus, the analysis of both systems shows advantages of a fluorescent system in signal values in comparison to a reflective system. Potentially, the signal value in the FMLD system is four times higher than in the ideal reflective system.

FIG. 1 shows schematically a fluorescent optical disc according to a preferred embodiment. The fluorescent optical disc 10 includes a transparent protective substrate 11 and successive data-carrying layers 12, located one above another, separated by polymer layers 13, and assembled in a single block by gluing the layers 14. A lacquer coverage 15 protects the fluorescent disc 10 from mechanical damage and aggressive media. A substrate 11 is a flat glass, polycarbonate, polymethylmethacrylate, or other polymer plane, transparent to visible light. The substrate 11 can be 0.6 mm or 1.2 mm thick with the diameter of 120 mm. The protective layer 15 is obtained by deposition and drying of a resin solution or by polymer film lamination with adhesive. Intermediate layers are 10-300 μm thick.

The protective layer 15, intermediate layer 13, adhesive layer 14, and information layer 12 have refractive indices at reading and fluorescence wavelengths close to one of the substrate 11. It is necessary to remove light reflection on the layer boundaries. There are several means by which the layers may be separated, such as:

A polymer solution may be poured onto the optical disc, followed by solvent evaporation.

An isotropic polymer film may be laminated with an adhesive on the optical disk.

The use of a UV-cured liquid or "dry film" photopolymerizing composition is the most interesting variant for obtaining separating layers. See FIGS. 4A and 4B, which illustrate the technological process of obtaining thin separating layers, which will be described below in greater detail.

Every data-carrying surface 12 is located on the separating layer 13 surface within FMLD bulk 10.

In general, an FMLD can contain only ROM layers or can also contain WORM and RW layers.

Another alternative is the possibility of also including in an FMLD spatially-separated reflective ROM, WORM or RW layers of a non-fluorescent nature (magneto-optical or phase change). The refraction index of these data layers differs from the separating layer refraction index.

It is preferable to place the transparent fluorescent layers closer to the reading radiation source, with reflective layers behind them.

As one can see from FIG. 1, spatially-separating information layers can be fully fluorescent (layer 16), if the fluorescent substance fills not only pits (ROM) or grooves (WORM) 17, but also the space 18 above them. In this case, absorption and fluorescence in pits or grooves will have higher absolute intensity.

In another variant, data layers have island-like structures, where only pits and grooves 19 are filled with fluorescent substance, providing higher contrast at reading.

Figure 2A:
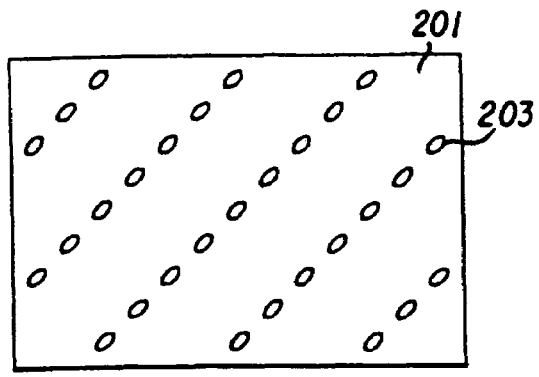
FIGS. 2A-2C. Configuration of pits in ROM and information signals, recorded in fluorescent WORM grooves.
Figure 2B:
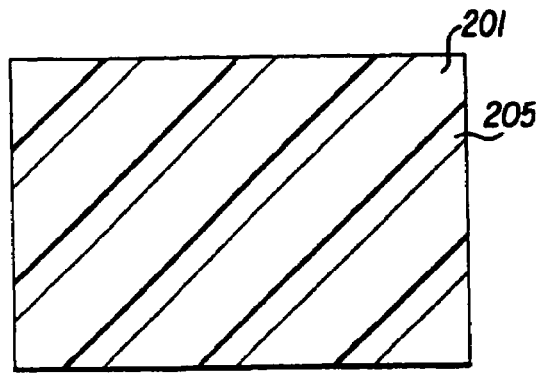
Figure 2C:
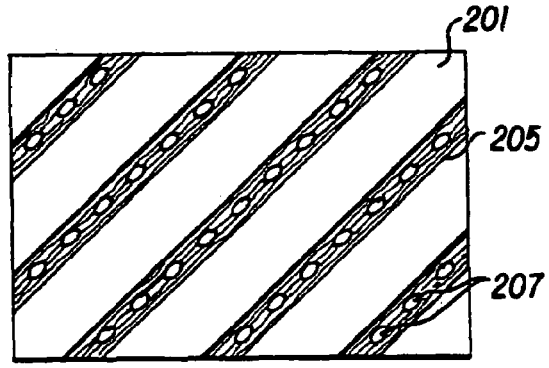

See FIGS. 2A-2C for CCD-microimages of a substrate 201 having fluorescent pits 203 (ROM, FIG. 2A), grooves 205 (WORM, FIG. 2B) and recorded images 207 in the grooves 205 (WORM, FIG. 2C).

We propose to widen the pit in comparison to the CD/DVD standard. In a CD or DVD, pit width is limited not by cross-talk from adjacent tracks, but by the fact that with interferential subtraction of radiation reflected from a pit from radiation of all spots, at a certain pit width the complete suppression of a reflected signal becomes possible. Increasing the width further, we get the reflected signal increase and the information signal decrease. For fluorescent discs, pit width is limited by cross-talk from adjacent tracks. The model calculations show 30% signal increase at a pit width 0.6 µm, while signal/noise ratio remained tolerable and equal to 70. From the above reasoning, we propose increasing the pit width up to 0.6 µm.

As stated above, the information signal value from FMLD layer i sufficiently depends on the absorption coefficients' distribution in pits and grooves of the different FMLD layers. Thus, the coefficients' distribution requires optimization. At the given distribution of absorption coefficients between the layers, fluorescent information signals from pits will have the same distribution of intensity.

It is a necessary optimization requirement that all information signals have equal intensity, irrespective of their location within the disc.

Figure 3:
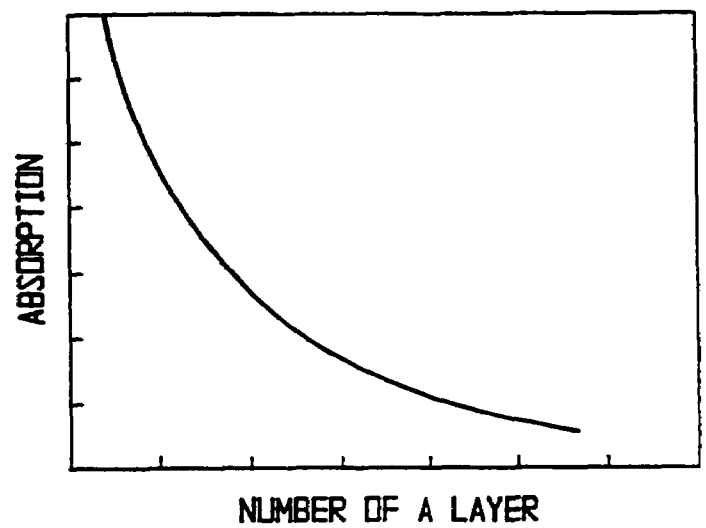
FIG. 3. Distribution of absorption coefficients in layers of a 10-layer fluorescent disc and of reflection coefficients in a 10-layer reflective disc.

See FIG. 3 for the absorption coefficients' distribution in layers, calculated for an ideal fluorescent disc.

Figure 4A:
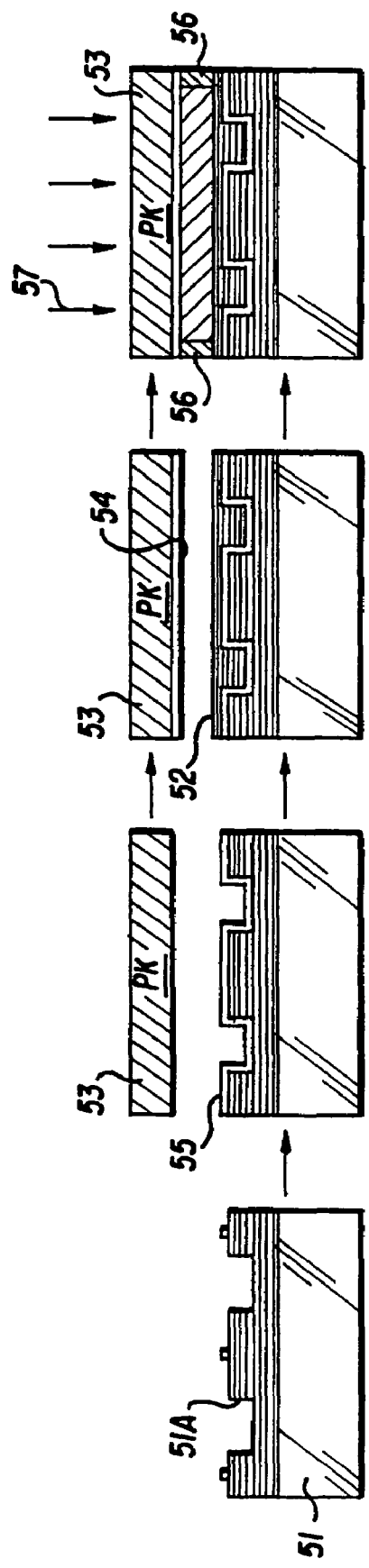
FIG. 4A. Steps of forming a recording layer of a fluorescent optical disc.

See FIG. 4A for a schematic description of the technological steps of forming the FMLD data-carrying layers, as one of the examples of the present invention.

The proposed method is based on successive, layer-by-layer forming of data-carrying layers with microrelief of pits or grooves, filling ROM, WORM or RW microrelief with fluorescent material, and their assembly as a multilayer structure.

Various methods used for mass replication of relief optical elements, such as CD-ROMs, relief holograms, and diffraction gratings, etc., can be used to form layers with microreliefs.

Use of liquid photopolymerized compositions (PhPC) or dry photopolymerized films, applied in microelectronics, is most preferable as a relief-base material.

According to the present process, the layer PhPC 52 is deposited on a glass or metal disc stamper 51 with cavities (pits or grooves) 51A and covered with a polycarbonate, glass or another substrate 53. To improve adhesion, the substrate can be covered with an adhesive layer 54. Anti-adhesive 55 (typically 100 Å thick) is used to diminish PhPC adhesion to stamper 51. Layers 54, 55 are optional.

Use of liquid PhPC allows utilization of spacers 56 with calibrated thickness (say, 10-30 microns). In case of dry film, PhPC spacers are not needed.

After PhPC is deposited and covered with substrate 53, the obtained sandwich is exposed to UV-radiation 57 until it is fully hardened.

The sandwich is dismantled and the obtained replica is covered with a fluorescent composition.

Figure 4B:
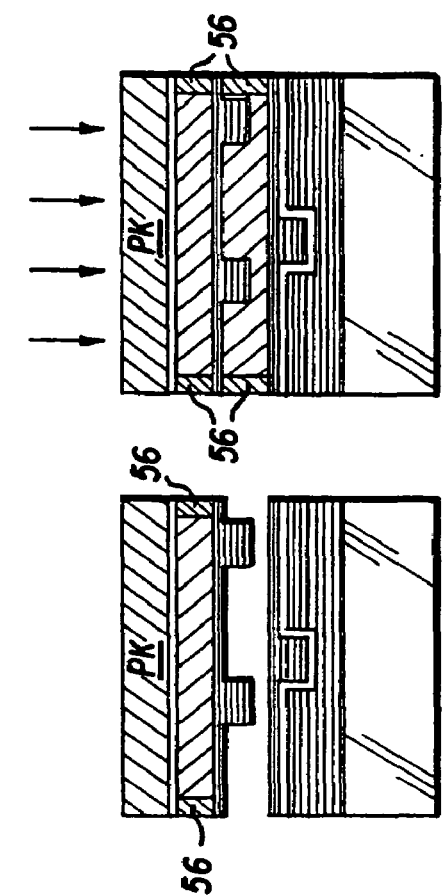
FIG. 4B. Steps of forming subsequent recording layers of a fluorescent optical disc.

Then the operations are repeated N times to obtain an N-layer disc, as shown in FIG. 4B.

In this case PhPC combines the functions of relief base, separating, and gluing substances.

An important problem during FMLD production is optimization of filling technology for the pits and grooves in the every data-carrying layer. Such optimization increases the contrast (the ratio of signals from fluorescence centers in pits to background signal from the layer surface outside pits). For the prototype of this decision, see the proposal described in "Fluorescent Optical Memory," U.S. Nonprovisional Application No. 08/944,402, filed on Oct. 6, 1997, based on U.S. Provisional Application No. 60/032,521, assigned to OMD Ltd. Here, a better method of volume filling the data-carrying layer surface cavities with fluorescent composition is proposed, which results in a higher fluorescent intensity difference between the useful signal from fluorescence centers in surface cavities and the background signal from the layer surface outside cavities.

The following method is proposed for production of multilayer fluorescent discs with fixed fluorescence centers (pits or grooves):

A. Relief Surface Preparation

The surface of an optically transparent data-carrying layer is physically or chemically treated in order to:

A1. Change its surface energetic properties;

A2. Change its hydrophilic/hydrophobic properties, and improve its surface wetting by deposition of a liquid polymerized composition;

A3. Improve the adhesion of the polymerization product to the surface; and

A4. Diminish the surface electric charge density or change the charge polarity, which influences surface sorption and aggregation of luminophors with polar or ionic (cation or anion) functional groups.

Possible methods of changing the surface physical and chemical characteristics and its chemical nature include: alkaline or acid hydrolysis; chemical or photochemical oxidation in active gas agents (i.e., oxygen) of functional surface groups, which if needed, could be modified chemically; halogenization; and sulfating or amination of surface macromolecules. The surface can be also processed by surface-active substances, deposition of antistatic substances on the surface (i.e., by aerosol spraying), adhesion promoters, covering with films of other chemical nature, through plasma-chemical processing, and also through processing in crown charge.

B. The optically transparent layer, prepared as described in A, with pits (cavities of certain form) on the surface, is covered with liquid polymerizating composition, containing:

B1. One or more liquid low-volatile components (monomers, oligomers) polymerizing under heat or electromagnetic-radiation (light or radiation-chemical effect);

B2. A solvent, if necessary, consisting of one or more components, which is more volatile than the liquid polymerizing components and does not dissolve the substrate material. The solvent can contain components with reactive functional groups, capable of being polymerized together with the polymerizing components described in B1;

B3. A polymerization catalyst, if necessary;

B4. A luminophore, consisting of one or more components, capable of being dissolved in the solvent and the polymerizing components. The luminophore can contain components with reactive functional groups, capable of being polymerized together with the polymerizing components as described in B1;

B5. Other additives, to improve the homogenous luminophore distribution in the liquid polymerizing components, and adhesion promoters as well.

In the case of low-viscous polymerizing components, use of the solvent described in B2 is not required, as one of the polymerizing components from B1 can dissolve other components.

C. The surface cavities of the information layer are filled in such a manner that allows a maximum difference between composition volume in the cavities (see B) and on the surface outside them. For example, C1. The liquid composition described in B is deposited on a substrate (disc) surface. Then the disc is rotated at a certain rate for a certain time. As a result, the highly volatile components of the solvent are removed from the composition with gradual accumulation of liquid low-volatile polymerizing components with dissolved luminophore in the surface cavities. Centrifugal force and solvent evaporation serve to withdraw excess liquid components from the substrate surface.

This sequence of operations can be repeated the necessary number of times to provide maximum filling of cavities. Mixing of the deposited composition with the liquid polymerizing components, and filling the pits in the process of deposition is hindered by their strong difference in viscosity.

C2. There is another method of filling the continuous cavities or channels (i.e., spiral). In this case, we apply an auxiliary plane transparent substrate to the substrate surface with cavities, fixing it mechanically or by pasting the edges together and providing for their maximum contact (i.e., by vacuum).

Therefore, we get a substrate with an empty continuous channel and with a fixed volume. Then the channel is filled through a hole on the edge of the pasted substrates or a hole from the plane substrate, with the composition described in B, whose viscosity is decreased by adding the solvent with reactive polymerizing groups. As a result of the capillary effect, the channel is filled with polymerizing composition. Pressure overfall between the channel ends can improve the process of filling. Then, if necessary, the two substrates can be disassembled.

D. After all operations described in C are completed, the liquid components should be polymerized by photochemical or thermal impact. This process is done to avoid luminophore destruction or change of the luminescence spectrum during polymerization hardening. For thermal polymerization one should apply certain temperatures and use appropriate initiators. If photochemical polymerization is used, one should choose certain photoinitiators and irradiation with the appropriate spectrum. For example, light filters can be used to selectively impact only the photoinitiator. The above-described method provides for formation of luminescence centers, fixed in cavities on the substrate surface.

E. To increase the difference in the luminescent intensity of the polymerized composition in cavities and the remaining polymer film on the substrate surface outside the cavities, it is necessary to reduce the luminophore concentration or its luminescence in the surface layer. For example, plasmochemical surface etching can reduce the surface film layer. Radical polymerization (i.e., for acrylates) can be realized through photoradiation of the liquid polymerizing composition from the substrate side, so that air or oxygen serves as an inhibitor, e.g., prevents surface layer polymerization. Thus they remain liquid and can be withdrawn from the substrate surface (i.e., by surface processing in a suitable solvent). The other possible method is a selective dosage over time on the surface exposed to UV-radiation, which causes a change of the chemical nature of the luminophore (i.e., photodestruction) in the sub-surface layer. Another possible method is an impact of dosed exposure to radiation of a certain spectrum (i.e., UV-light), on the additional substance in the composition, which forms a fluorescence quencher under light. A fluorescence quencher can also be brought into the sub-surface layer by dosed diffusion from its liquid (solution) or gas (vapor) phases during their contact with the information layer surface.

The present invention also offers the following method of multilayer optical disc manufacture with fixed luminescence centers. The initial composition, containing solvent, polymerization components, cure catalyst, and auxiliary substances described in B1, B2, B3, B5, does not contain the luminophore described in B4. The cavities on the substrate surface are filled with liquid polymerizing substance, as described above. Thermal- or photocuring is used for polymerizing components. Photocuring in this case does not require a light filter to speed up the process. The surface is then etched (i.e., plasma-chemically), to withdraw the remaining polymerized film outside the cavities. The surface thus has different physical and chemical properties in the region of cavities and outside them, including density, porosity, wetting and absorption ability, etc. Then the obtained substrate is brought into contact with a liquid (solution) or gas (vapor) phase, containing a luminophore. The luminophore diffuses into the polymerized composite in the surface cavities with selective absorbtion of luminophores. Then the process of thermal or photo processing follows, for drying and fixing the luminophore.

After performing the above operations, the obtained information layers are glued to each other by one of the methods shown in FIGS. 4A and 4B, using materials with certain optical characteristics (i.e., optically transparent in the spectrum range above 300 nm with a refraction index equal to that of the substrate). Thus, we obtain a multilayer disc with fixed luminescence centers.

The information layers are either glued by autoclave pressing, using connecting polymer films (i.e., polyvinylbutyrate, siliconorganic, urethane) located between them, or by pouring monomers or oligomers between the layers with their furthur polymerization. The polymerizing components used can be the same as those used in the luminophore composition (B).

Figure 5:
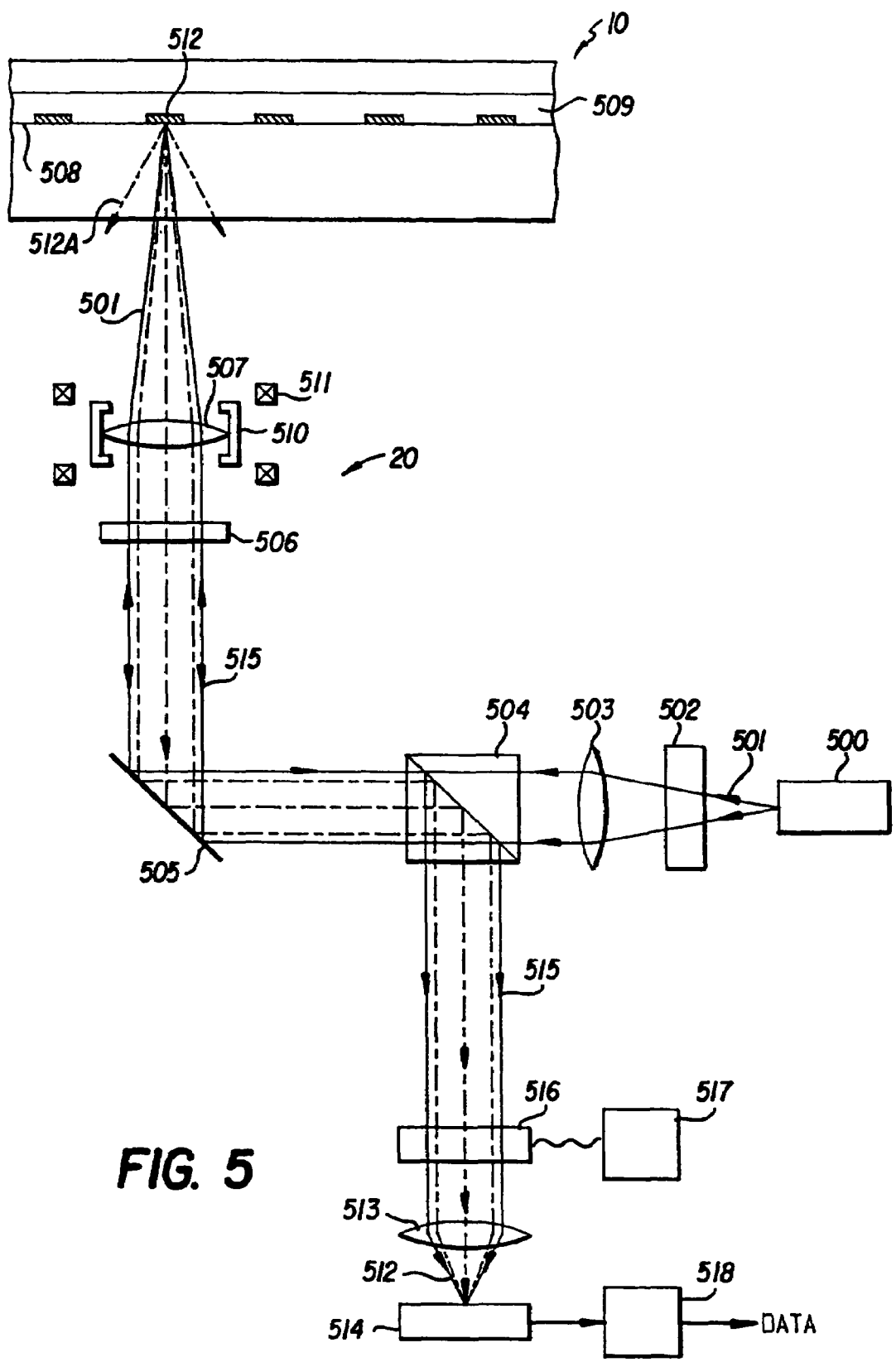
FIG. 5. A simplified flowchart of an optical data storage system as the first embodiment of the present invention.

See FIG. 5 for the simplified scheme of an optical data storage system using the fluorescent optical disc 10.

This optical system is constructed as a ROM or WORM and RW type optical disc retrieving apparatus, in which the circularly polarized beam falls on the fluorescent optical disc 10 and the recorded information is detected as the fluorescence radiation intensity varies.

Optical head 20 includes a laser diode 500 producing a primary linearly polarized light beam 501 at approximately 650 or 780 nm. Grating 502 diffracts beam 501 to produce two secondary beams for tracing, in addition to the first primary beam.

The resulting three-component beam is transmitted through the lens 503 and beam splitter 504 and is reflected by mirror 505 and then passes the quarter-wavelength plate 506. The plate 506 makes the beam circularly polarized. Then the light beam passes through a focus of the lens 507 and is focused onto one of the data surfaces (surface 508 of substrate 509) of fluorescent optical disc 10. Lens 507 is mounted to holder 510, which is adjusted to an optical disc position by the focus actuator motor 511.

In case there is a informative pit 512 in this microregion, the laser beam 501 is partly absorbed and reemitted as fluorescent radiation 512A. This radiation is focused on a multi-sector detector 514 with the help of the lens 507, mirror 505, and beam splitter 504. Part of the laser beam 501 can be reflected from the data surfaces 508 and utilized as a reflection beam 515.

When the reflected beam 515 passes through the λ/4 plate 506, it becomes linearly polarized, while its polarization plane turns 90 degrees. Thus, the reflected beam 515 is split by the beam splitter 504 and directed on the detector 514.

Figure 6:
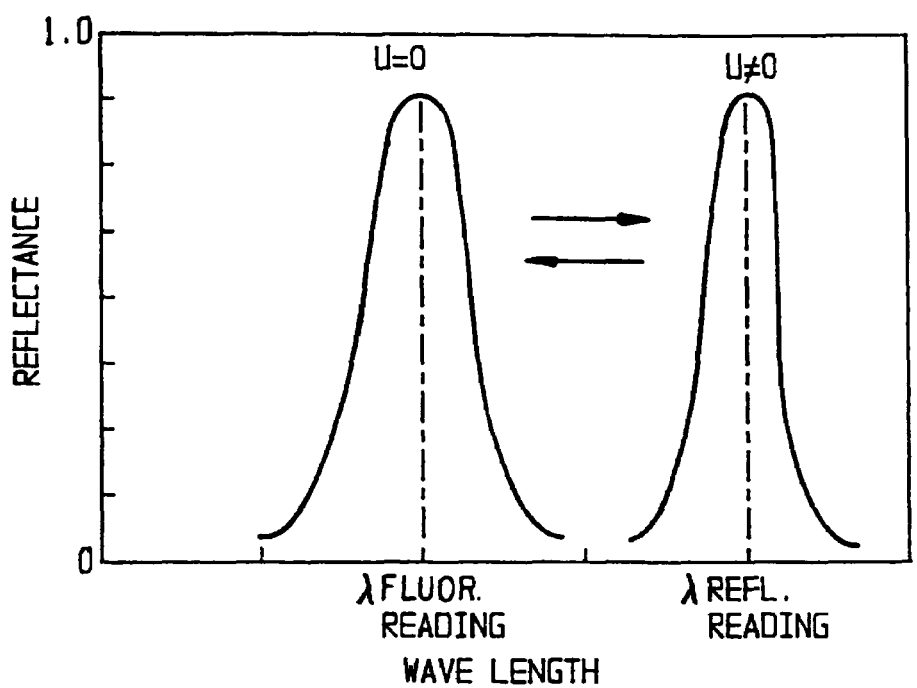
FIG. 6. A plot reflectance for the Notch filter as a spectral filter.

The above system can diminish the signal-noise ratio at fluorescent reading. However, in contrast to the reading laser radiation, fluorescent radiation is not polarized and has another wavelength. Therefore, they can be separated by spectrum or polarization filters 516, such as passive, i.e., interferential or dichroic filters, polarizers of Glan-Tompson type or film-laminated polaroids. It is possible to use the built-in electrically controlled spectrum filters of Notch type on the base of holesteric liquid crystals or of Pockels cells' type. See FIG. 6 for the reflection spectrum of such a filter at two values of controlling voltage from unit 517. One can see that such filters provide quality filtration upon the spectrum. Thus, such device provides data retrieving both from fluorescent ROM, WORM or RW optical discs and the usual CD or DVD ROM, WORM and RW systems of magneto-optical and phase-change types.

One of the problems in reading from fluorescent multilayer discs is to compensate the influence of fluorescent dye lifetime on data pulse duration. It is also possible to increase maximum reading rate.

Figure 8:
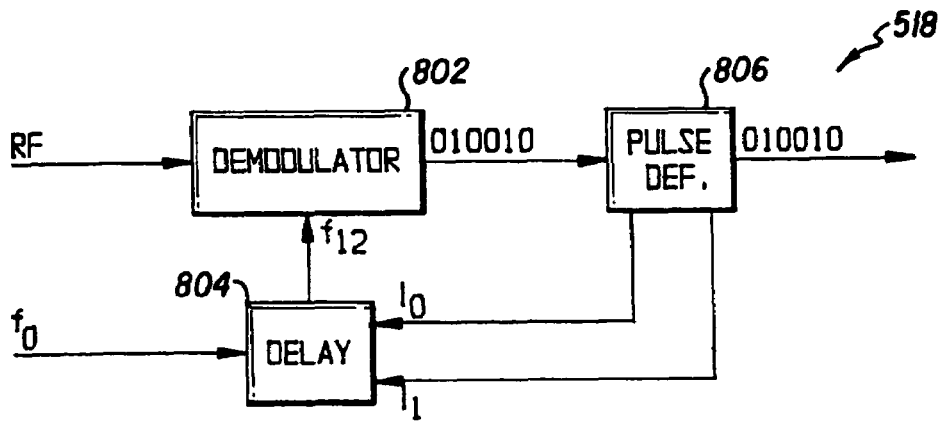
FIG. 8. The flowchart of a compensation system according to the present invention.
Figure 7:
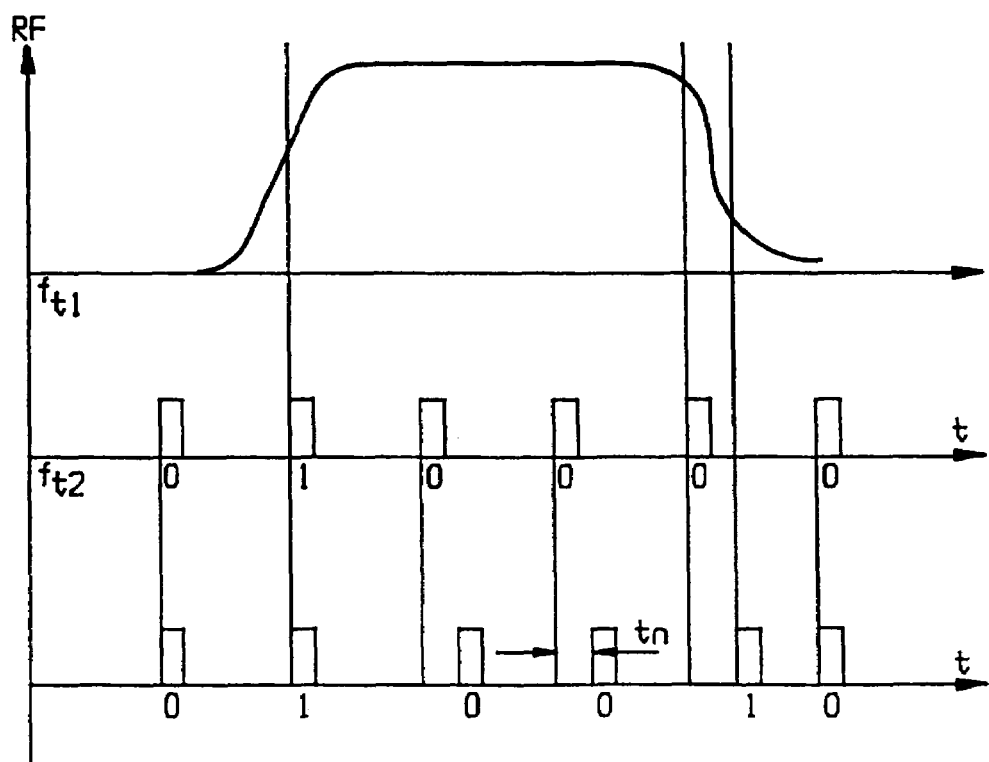
FIG. 7. Voltage epurs.

It is known that the pulse front is defined at the moment of clock pulses switching (FIG. 7). Because of jitter, this moment can coincide not with the edge, but with the pulse peak or bottom. Then a wrong decision is possible. We propose the following method of compensation. After the leading edge is registered, the device 518, shown in FIG. 5 and described schematically below with reference to FIG. 8, provides a time shift of all clock pulses on time, approximately equal to fluorescence lifetime. In this case, the clock pulse will coincide with the trailing edge, thus compensating the delay influence. After the trailing edge is registered, a time shift of the clock pulses is cancelled. At a fluorescence lifetime of 2-3 ns, a disc rotation rate of 10 is possible. The proposed method can compensate the front delaying up to 0.2-0.3 ns, thus, making it possible to reach the rate of up to x100 without limitations.

See FIG. 8 for the flowchart of the compensating device 518, additionally placed on the multi-segment optical detector output (FIG. 5). It includes a demodulator, which receives an RF signal and a signal at $f_{r2}$, which demodulates the signal at the coming of signal at $f_{r2}$. The last is formed in a controlled delay circuit 804 which delays pulses at $f_{r1}$ on the time $\tau_{fl}$ after it receives signal $1_1$ (that is $f_{r2} = f_{r1} + 1/\tau_{fl}$) on its input. After it receives pulse $1_0$, the delay circuit becomes disconnected and the unit just emits pulses at $f_{r2} = f_{r1}$. The pulse edge sign definition scheme 806 generates pulse $1_1$ when passing the RF signal leading edge or pulse $1_0$ when passing its trailing edge.

See FIGS. 9A-9D for another schematic flowchart of an optical storage system with a mechanically pushed-in interference filter 903, as described in the present invention. In this scheme, radiation 501 from semiconductor laser 500 (λ=650 or 780 nm) via semi-transparent mirror 901, mirror 902, and aspherical lens 509, is focused on the information layer of the optical disc 10. The reflected 905 or fluorescent signal 906 (depending on the disc type) sent via semi-transparent mirror 901 is received by a multi-segment photodetector 514. Depending on the type of the disc 10, the interference filter 903 which transmits radiation with fluorescence wavelength $\lambda_{fl}$, and does not transmit with the laser wavelength, is pushed in front of the multi-segment photodetector. The disc type can also be recognized automatically. For this purpose, in a starting position the filter should be in front of the photodetector and, if after the start of reading there is a signal on the output of the photodetector, it is an FMLD disk; if there is no signal, then it is either a CD or DVD disc. In the latter case a filter is pushed forward and the photodetector receives the signal on the laser wavelength reflected from the disk.

Figure 9A:
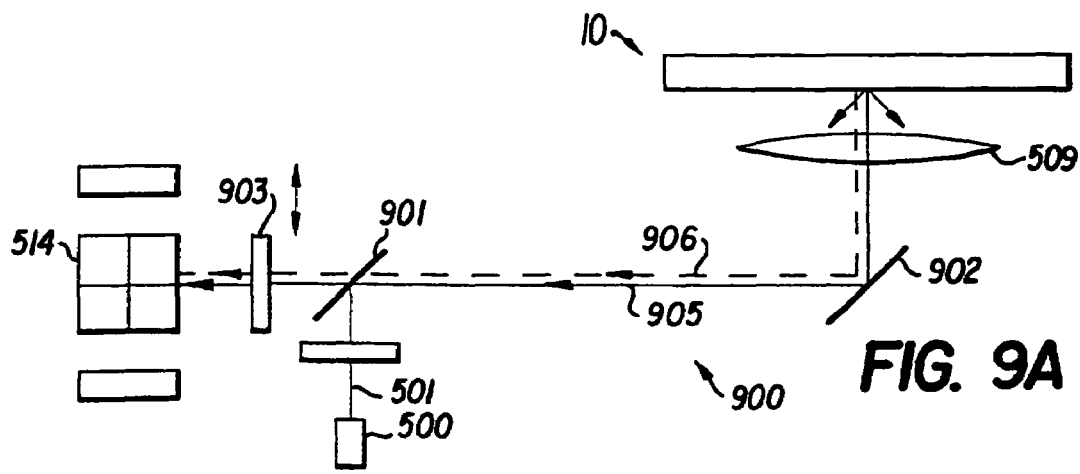
FIGS. 9A-9D. Schematic flowchart of an optical data storage system according to the present invention.
Figure 9B:
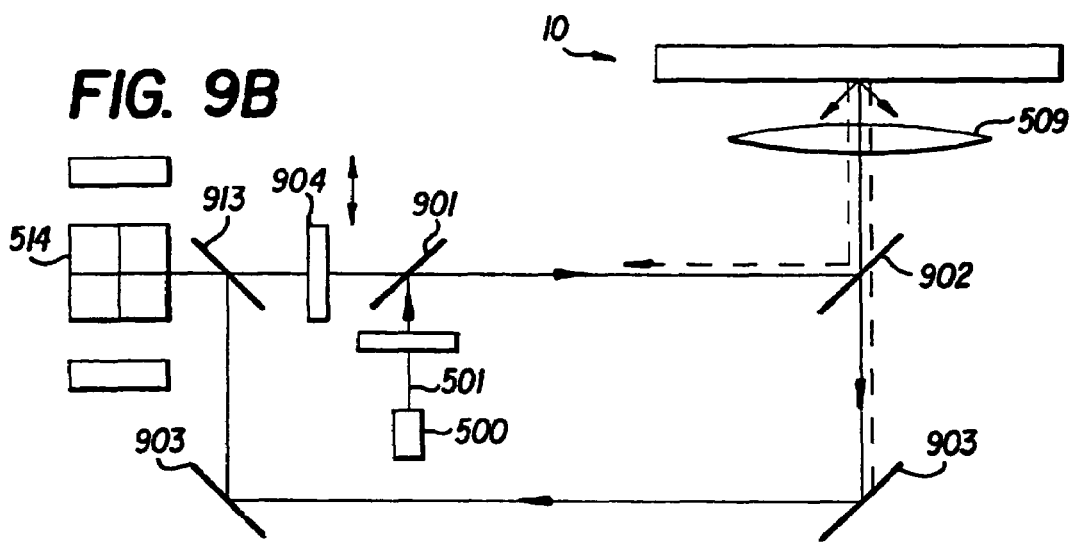

See FIG. 9B for the FMLD drive scheme with dichroic mirrors 902. In contrast to the above-described drive, here the reflected 905 or fluorescent 906 signal from the optical disc is received by a dichroic mirror 902, which reflects radiation at a laser wavelength and transmits the radiation at a fluorescence wavelength $\lambda_{fl}$. Then the fluorescent signal passes through a system of dichroic mirrors, which also serve as spectrum filters, and is received by a multisegment photodetector 514. Depending on the disc type, the shutter 904, which stops the reflected radiation at laser wavelength, is either pushed back or forward. The disc type can also be recognized automatically following the above procedure.

See Fig. insert proper figure # for FMLD drive scheme, which is [word omitted] on the same plane with two photodetectors. Unlike the two previous schemes, it has no moving elements, but has an additional photodetector. Similar to the above described scheme, the reflected or fluorescent signal from the optical disc is received by dichroic mirror 902, which reflects radiation at the fluorescence wavelength $\lambda_{fl}$, and transmits radiation at the laser wavelength. Then the fluorescent signal at $\lambda_{fl}$ passes through the filter to the first multi-segment photodetector, and radiation at the laser wavelength is received by the second multi-segment photodetector. In this case, the disc type can be recognized automatically by the signal presence on the appropriate photodetector output.

Figure 9C:
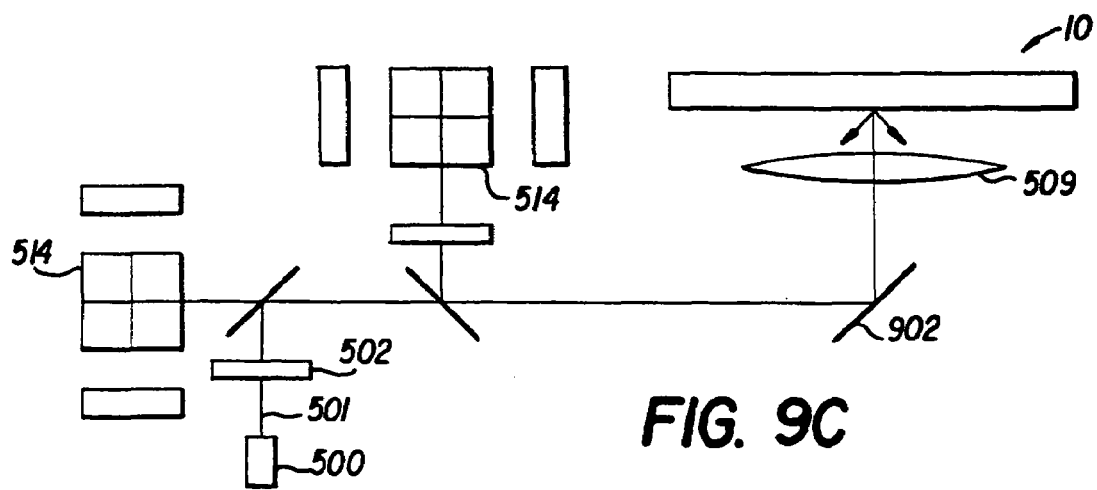
Figure 9D:
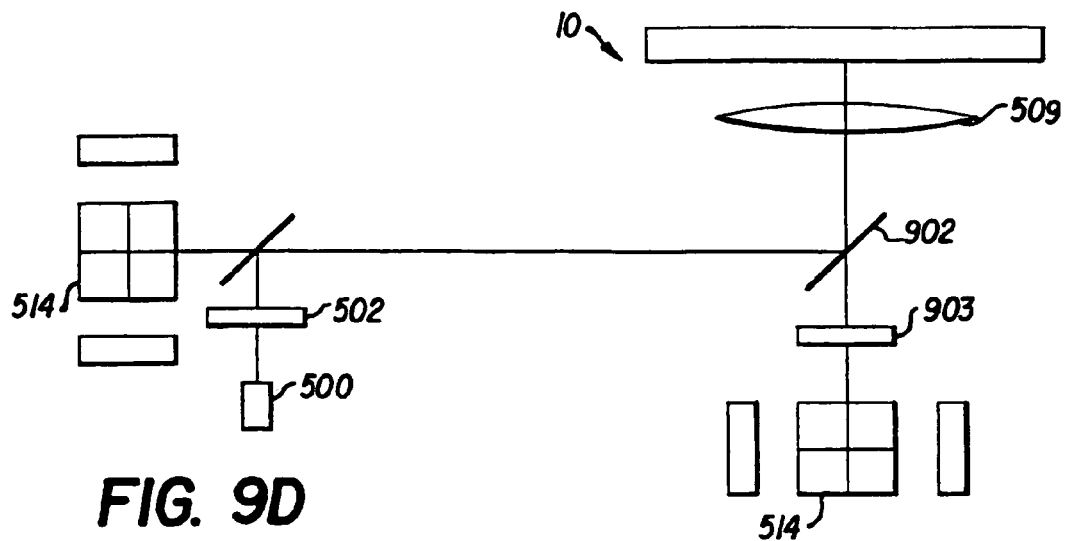

The difference between the schemes in FIGS. 9C and 9D is that the latter requires one mirror less, hence the reading device is located both in parallel and in perpendicular planes to that of the disc.

Thus, the devices shown in FIGS. 5 and 9A-9D can provide reading and recording both on FMLD, CD and DVD, thus broadening their application range.

Figure 10A:
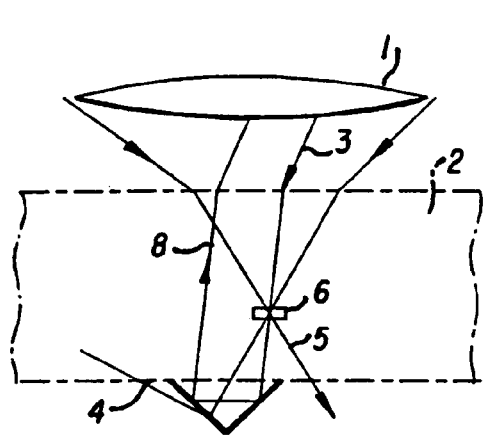
FIGS. 10A-10C. Schematic examples of multilayer fluorescent optical disc structure with angled mirrors.
Figure 10B:
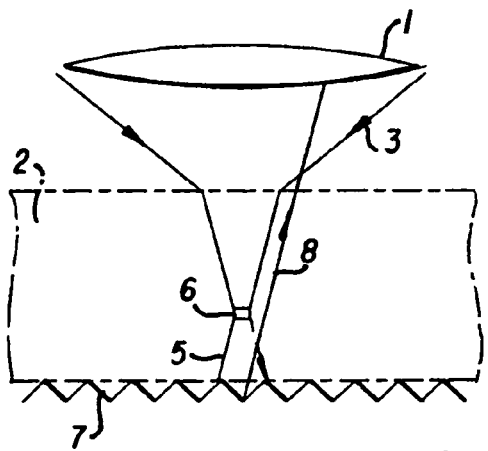
Figure 10C:
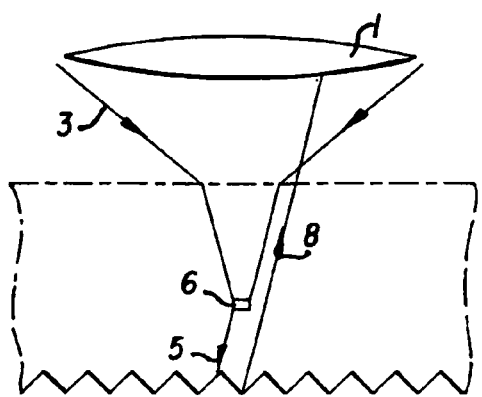

To increase the received fluorescent signal, we propose placing a light-collecting element on the back side of the disc, for example, an angle reflector as a mirror or pyramid (see FIGS. 10A-C).

In this case, the fluorescent radiation 5 passes through the back side of the optical disc 2, is reflected by the angle reflector 4, and then is collected 8 by the aspherical lens 1 of the drive's reading system. This method allows nearly double the fluorescent signal.

The angle reflector can be realized as a separate element 4 (FIG. 10A), which follows the position of the reading spot 3, 6 with the help of a special device and combines optical axes of the reading system with those of the angle reflector. The second way to realize this method is to form micro-angle reflectors 7 on the disc surface (see FIG. 10B). At reading, this disc is located under the FMLD.

The third variant of the method's realization is to form micro-angle reflectors 9 on the FMLD back side (see FIG. 10C). In this case, it is possible to avoid radiation losses caused by reflection on the disc-air and air-disc boundaries, which can take place in the previous two variants. The micro-angle reflectors can be formed in a similar way to pit forming technology on CD, with following metal deposition for increasing reflectivity.

To obtain a maximum signal on the photodetector located in the focal plane of the drive's aspheric lens, acting also as a spatial selector, the geometric sizes of angle reflector d should be much less than the spot radiation from which is collected by the lens:

$$d \ll h^* \sqrt{(1/1-(NA \backslash n)^2)},$$

where h is the distance between the pit and the angle reflector; NA is the lens numerical aperture; and n is the disc refraction index.

While various preferred embodiments of the present invention have been set forth above, those skilled in the art who have reviewed the present disclosure will readily appreciate that other embodiments can be realized within the scope of the present invention. For example, the thicknesses and numbers of layers are illustrative rather than limiting. Therefore, the present invention should be construed as limited only by the appended claims.

What is claimed is:

1. A multilayer hybrid fluorescent optical disc having a top surface for receiving radiation for reading information from the disc, with the disc comprising a substrate having front and back sides, with a plurality of first layers having information-carrying surfaces successively located on the front side of the substrate, with the first layers being spatially divided by polymer layers and assembled together in a single unit with adhesive layers and with the substrate back side covered with a protective layer.

2. The optical disc of claim 1, wherein the substrate, polymer and adhesive layers are transparent to reading radiation.

3. The optical disc of claim 1, wherein the polymer layers are 10-300 μm thick.

4. The optical disc of claim 1, wherein the information-carrying surfaces of the first layers comprise optically detectable marks or pits.

5. The optical disc of claim 4, wherein the optically detectable marks are fluorescent.

6. The optical disc of claim 5, wherein the information-carrying surfaces of the first layers are constructed to provide an intensity of a detected signal that is constant and independent of distance of each information-carrying surface from the top surface of the disc.

7. The optical disc of claim 6, wherein the first layers are arranged so that absorption of fluorescent information marks grows with an increasing number of first layers.

8. The optical disc of claim 5, wherein each optically detectable mark is about 0.6 μm wide.

9. The optical disc of claim 5, wherein each information-carrying surface is covered with a continuous layer of a fluorescent substance and which has a larger thickness above the information-carrying marks comparatively to regions outside the marks.

10. The optical disc of claim 5, wherein each information-carrying layer comprises a fluorescent substance which fills only the pits.

11. The optical disc of claim 1, wherein all first layers are fluorescent ROM layers.

12. The optical disc of claim 11, further comprising at least one fluorescent layer of WORM or RW type.

13. The optical disc of claim 4, wherein all layers have nearly the same refraction index.

14. The optical disc of claim 1, wherein the polymer layers are made from photo-cured liquid compositions.

15. The optical disc of claim 14, wherein liquid photopolymerized intermediate layers also serve as the adhesive layers.

16. The optical disc of claim 1, wherein the polymer layers are dry photopolymer films.

17. The optical disc of claim 1, further comprising reflective ROM, WORM or RW layers.

18. The optical disc of claim 17, wherein the reflective layers are located behind the fluorescent layers.

* * * * *